(12) United States Patent
Gehret et al.

(10) Patent No.: US 9,121,326 B2
(45) Date of Patent: Sep. 1, 2015

(54) ASSEMBLY AND METHOD FOR REDUCING NITROGEN OXIDES, CARBON MONOXIDE AND HYDROCARBONS IN EXHAUSTS OF INTERNAL COMBUSTION ENGINES

(71) Applicant: Tecogen, Inc., Waltham, MA (US)

(72) Inventors: Joseph B. Gehret, Lynnfield, MA (US); Robert A. Panora, Cambridge, MA (US); Ranson Roser, Reno, NV (US)

(73) Assignee: Tecogen Inc., Waltham, MA (US)

( * ) Notice: Subject to any disclaimer, the term of this patent is extended or adjusted under 35 U.S.C. 154(b) by 71 days.

(21) Appl. No.: 14/077,607

(22) Filed: Nov. 12, 2013

(65) Prior Publication Data

US 2014/0196438 A1    Jul. 17, 2014

Related U.S. Application Data

(63) Continuation of application No. 12/816,706, filed on Jun. 16, 2010, now Pat. No. 8,578,704.

(60) Provisional application No. 61/343,392, filed on Apr. 28, 2010.

(51) Int. Cl.

| | |
|---|---|
| *F01N 3/22* | (2006.01) |
| *F01N 3/28* | (2006.01) |
| *F01N 3/02* | (2006.01) |
| *F01N 3/04* | (2006.01) |
| *F01N 3/05* | (2006.01) |
| *F01N 3/10* | (2006.01) |
| *F01N 3/20* | (2006.01) |
| *F01N 13/00* | (2010.01) |

(52) U.S. Cl.
CPC ............ *F01N 3/2882* (2013.01); *F01N 3/0205* (2013.01); *F01N 3/04* (2013.01); *F01N 3/05* (2013.01); *F01N 3/101* (2013.01); *F01N 3/2046* (2013.01); *F01N 13/009* (2014.06); *F01N 13/0097* (2014.06); *F01N 2240/36* (2013.01); *Y02T 10/22* (2013.01); *Y02T 10/26* (2013.01)

(58) Field of Classification Search
CPC .......... F01N 3/0205; F01N 3/04; F01N 3/05; F01N 3/101; F01N 3/2046; F01N 3/2882; F01N 13/009; F01N 13/0097; F01N 2240/36; Y02T 10/22; Y02T 10/26
USPC ........... 60/274, 287, 288, 289, 292, 296, 298, 60/299, 301, 310, 318, 320
See application file for complete search history.

(56) References Cited

U.S. PATENT DOCUMENTS

| | | | | |
|---|---|---|---|---|
| 4,100,994 | A | * | 7/1978 | Stuart ............................ 181/261 |
| 4,983,135 | A | * | 1/1991 | Boda et al. .................. 440/88 R |
| 5,499,501 | A | * | 3/1996 | Kato et al. ....................... 60/286 |
| 5,609,021 | A | * | 3/1997 | Ma .................................. 60/274 |

(Continued)

*Primary Examiner* — Thomas Denion
*Assistant Examiner* — Jorge Leon, Jr.
(74) *Attorney, Agent, or Firm* — Intrinsic Law Corp.; Ibrahim M. Hallaj (57) ABSTRACT

An assembly and method for reducing nitrogen oxides, carbon monoxide and hydrocarbons in exhausts of internal combustion engines, wherein the exhaust is acted upon in a first stage catalytic converter. A first portion of the first stage catalytic converter output is cooled and a second portion of the catalytic converter output is not cooled. The cooled and not cooled exhausts are united and directed to a second stage catalytic converter. Air is injected into a selected one of (1) the not cooled exhaust prior to the juncture thereof with the cooled exhaust, and (2) the combined cooled and not cooled exhausts after the juncture thereof.

20 Claims, 10 Drawing Sheets

(56) References Cited

U.S. PATENT DOCUMENTS

| | | | |
|---|---|---|---|
| 5,934,069 A * | 8/1999 | Hertl et al. | 60/274 |
| 6,016,654 A * | 1/2000 | Schatz | 60/291 |
| 6,178,744 B1 * | 1/2001 | Perset | 60/288 |
| 6,422,007 B1 * | 7/2002 | Hartick | 60/298 |
| 6,438,943 B1 * | 8/2002 | Yamamoto et al. | 60/274 |
| 6,568,179 B2 * | 5/2003 | Deeba | 60/298 |
| 7,171,800 B2 * | 2/2007 | Shih et al. | 60/288 |
| 2006/0021332 A1 * | 2/2006 | Gaiser | 60/286 |
| 2010/0043413 A1 * | 2/2010 | Orihashi et al. | 60/320 |
| 2010/0146954 A1 * | 6/2010 | Sloss et al. | 60/320 |

* cited by examiner

ASSEMBLY AND METHOD FOR REDUCING NITROGEN OXIDES, CARBON MONOXIDE AND HYDROCARBONS IN EXHAUSTS OF INTERNAL COMBUSTION ENGINES

REFERENCE TO PENDING PRIOR PATENT APPLICATIONS

This patent application is a continuation of pending prior U.S. patent application Ser. No. 12/816,706, filed Jun. 16, 2010 by Joseph B. Gehret et al. for ASSEMBLY AND METHOD FOR REDUCING NITROGEN OXIDES, CARBON MONOXIDE AND HYDROCARBONS IN EXHAUSTS OF INTERNAL COMBUSTION ENGINES, which in turn claims benefit of prior U.S. Provisional Patent Application Ser. No. 61/343,392, filed Apr. 28, 2010 by Joseph B. Gehret et al. for APPARATUS AND METHOD FOR IMPROVING ENGINE EXHAUST AFTERTREATMENT IN SPARK-IGNITED GEASOUS-FUELED ENGINES.

The above-identified patent applications are hereby incorporated herein by reference.

BACKGROUND OF THE INVENTION

1. Field of Invention

This invention relates to treatment of exhausts of internal combustion engines, and more particularly to reduction of nitrogen oxides, carbon monoxide and hydrocarbons prevalent in the exhausts of internal combustion engines, particularly spark-ignited, gaseous-fueled internal combustion engines.

2. Description of the Prior Art

Spark ignited (SI) internal combustion (IC) engines operated with gaseous fuels produce small amounts of undesirable chemical compounds in the combustion chamber, compounds which are exhausted from the engine at high temperatures (800°-1250° F.). For fuels composed primarily of methane and other light hydrocarbons, the commonly regulated chemicals are nitrogen oxides (NO, $NO_2$, or generally NOx) and carbon monoxide (CO). Nitrogen oxides are formed when nitrogen ($N_2$), a major component of air, reacts with oxygen ($O_2$), another major component of air, when both are exposed to high temperatures and pressures in an engine combustion chamber. Carbon monoxide, on the other hand, is the consequence of failure of the fuel to completely react with oxygen, resulting in the formation of carbon dioxide ($CO_2$). CO and NOx are problematic pollutants inasmuch as their regulated values are in many geographical regions set at or below the limits of current technology.

In strictly regulated regions, current practice to control the emissions from SI/IC engines fueled by methane-rich fuels (natural gas, bio-fuels, landfill gas, etc.), is to install systems in the engine exhaust ducting to eliminate, to the extent required by regulations, such chemicals. For smaller engines (less than 1000 bhp), the common aftertreatment system is a single stage catalyst. In these small systems, the products of combustion exiting the engine are forced through a catalyst monolith (honeycomb structure with precious metal coating) which facilitates the desirable oxidation and reduction reactions:

The nitrogen oxides are reduced to gaseous nitrogen ($N_2$) and oxygen ($O_2$), both benign, while the carbon monoxide (CO) is completely oxidized, forming carbon dioxide ($CO_2$), likewise non-harmful and unregulated.

Figure 1:
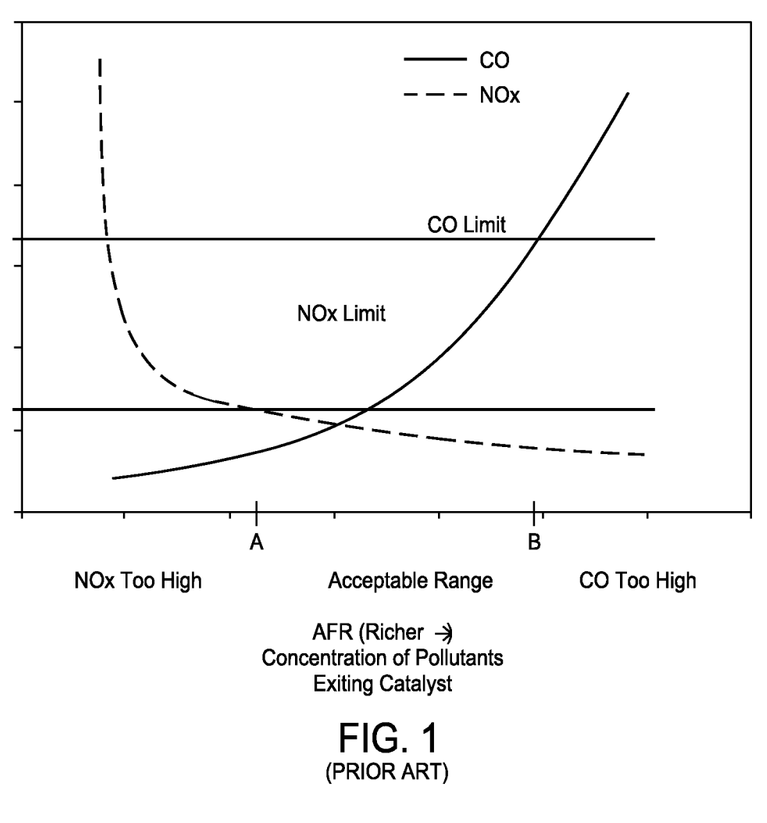
FIG. 1 is a chart depicting prior art relationships between nitrogen oxides and carbon monoxide present in engine exhaust gases, within and beyond acceptable ranges, given a precisely controlled air/fuel ratio.

Current catalyst-based emissions systems rely on very accurate control of engine operating parameters to maximize the conversion efficiency of the reactions noted above. Specifically, the simultaneous elimination of NOx and CO through such reactions in a catalytic converter requires a precise operating window of the engine combustion process relative to the mixture of air and fuel. This is depicted in FIG. 1 for a typical SI/IC engine. As shown, rich mixtures result in low NOx out of the catalyst but high CO, while lean mixtures result in low CO, but high NOx. From FIG. 1, it is evident that simultaneous cleanup of NOx and CO requires that the engine air/fuel ratio (AFR) be precisely controlled in the narrow region around the stoichiometric air/fuel ratio. Compliance of both regulated pollutants can only be maintained when the combustion stoichiometry is maintained within points A and B of FIG. 1. The acceptable combustion mixture, to achieve increasingly strict emissions standards, requires that the engine air/fuel ratio be controlled within narrow limits.

Referring still to FIG. 1, there is depicted typical engine emissions as a function of AFR from a SI/IC engine equipped with a single or multiple three-way catalyst (TWC). Meeting the regulated limits for CO and NOx requires that engine AFR be maintained between points A and B of FIG. 1, a band approximately representing the stoichiometric AFR.

Stationary SI/IC engines operating in most applications in the U.S. and elsewhere are highly regulated relative to allowable CO and NOx emissions, which are becoming increasingly controlled. Most notably, the California Air Resource Board (CARB) now recommends limits of 0.07 lb/MWh and 0.1 lb/MWh CO as part of their 2007 standard for Combined Heat and Power (CHP) applications. Applying a heat recovery credit for maintaining a minimum 60% overall system effeciency and assuming a 27% electrical efficiency, the emissions limits stated in terms of actual concentration in the exhaust gas are 3.7 PPM NOx and 8.9 PPM CO. As used herein, "PPM" means parts per million by volume corrected to a standard air dilution factor (15% oxygen equivalent). The area of Southern California under the jurisdiction of the South Coast Air Quality Management District (SCAQMD) has adopted the "CARB 2007" standard for NOx, while restricting CO emissions to a value close to the CARB limit. Other regions in California are likewise adopting similar standards, while other regions of the country are phasing in regulations approaching the CARB 2007 standards (MA, NY, and NJ, for example).

Compliance with the newer standards requires extremely high conversion efficiency in the catalyst for both CO and NOx. Extra-large conversion monoliths are needed in addition to extreme precision in controlling the air/fuel mixture.

Figure 2:
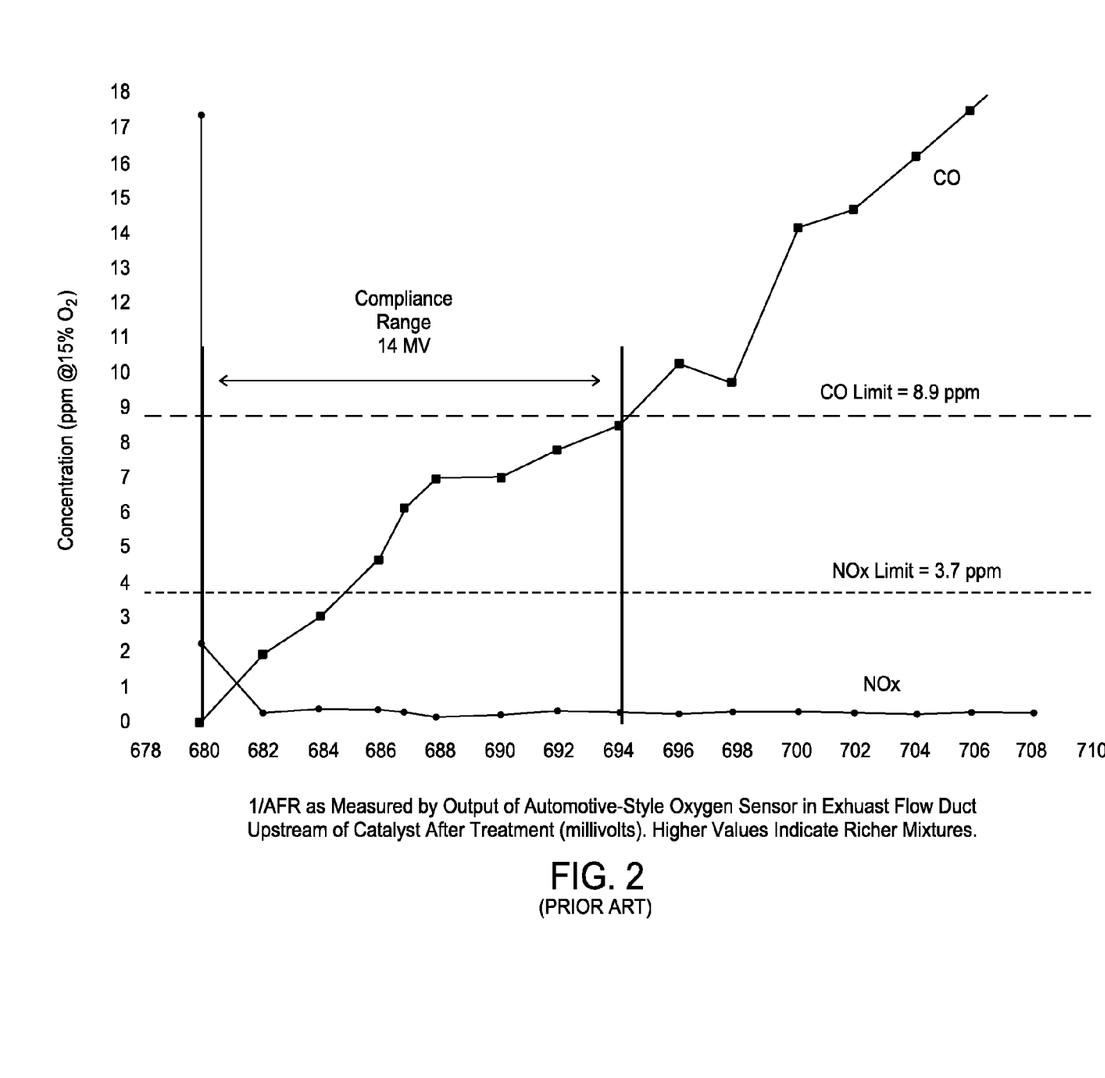
FIG. 2 is a chart illustrating the prior art steady-state air/fuel ratio control precision required for a standard engine, using a three-way catalyst.

FIG. 2 depicts the steady-state AFR control precision required for a standard engine (model TecoDrive 7400) utilizing a TWC system sized to conform to CARB 2007, as indicated by a pre-catalyst narrow-band heated exhaust gas oxygen sensor millivolt (mV) output the AFR controller maintains via steady-state (non-dithering) AFR control. As shown in FIG. 2 the engine combustion mixture (air to fuel ratio) is acceptable for catalyst performance to regulated limits only when the signal from a standard lambda sensor in the exhaust duct is maintained between 680 and 694 mV. Above this range, the CO concentration exiting the catalyst exceeds the SCAQMD limit of 8.9 PPM, while below this range the NOx will rapidly exceed the 3.7 PPM limit. Limits shown in FIG. 2 are those of CARB 2007 with a credit for engine heat recovery, such that 60% of the fuel's heat content is purposefully used as electric power or recovered thermal energy. In order to maintain compliance, combustion air to fuel mixture must be maintained within the 14 mV window for the example shown.

A possible method for expanding the control window for engine operation to attain acceptable emissions from both CO and NOx, is to modify the system such that two stages of catalyst systems are used, each operating in distinctly different chemical atmospheres. Early catalyst systems commonly used a two-stage design with inter-stage air injection. In this era, single purpose catalyst monoliths-oxidation or reduction, but not both, were employed. Later, as multi-purpose, single stage catalysts (TWC) were developed, these became the dominant style. The early two-stage systems were employed in stationary gaseous fueled SI/IC engines with success but under far less strict standards. Presumably, the NOx reformation problems encountered with the two-stage systems were present in the earlier era, but were inconsequential relative to the regulated limits at that time.

Figure 3:
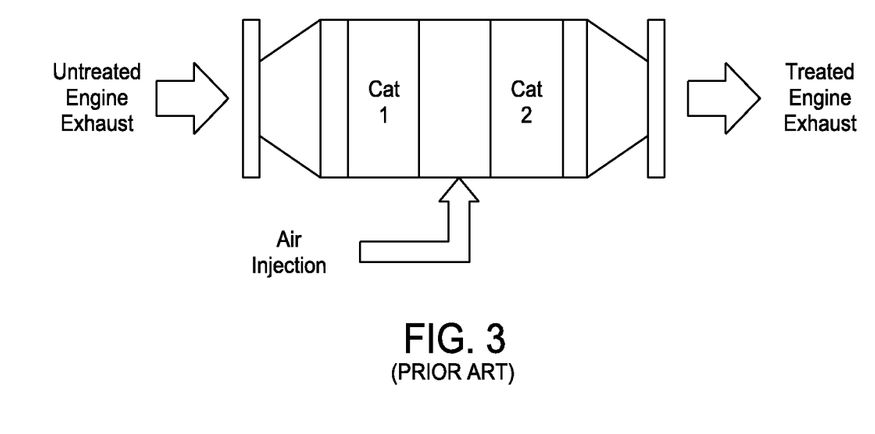
FIG. 3 is a diagrammatic depiction of a prior art two-stage catalyst system with inter-stage air injection.

FIG. 3 depicts the above-described arrangement. As shown, two catalyst stages are plumbed into an exhaust system in series. Air is pumped into the exhaust stream between stages one (CAT 1) and stage 2 (CAT 2) and mixed thoroughly. The engine air-to-fuel ratio is maintained so as to facilitate effective NOx removal in the first stage. The air injected into the exhaust results in an oxidizing environment at the second catalyst stage biased towards the oxidation of CO to $CO_2$, even if the engine AFR is outside the acceptable operating window on the rich side, a highly significant benefit.

Tests utilizing the two-stage system demonstrated that the two-stage strategy with air injection was not only ineffective, but actually detrimental to catalyst performance. NOx emissions from the two-stage system were found to be generally higher than a single-stage system of comparable size and catalyst material loading. This surprising result indicated that a mechanism exists such that NOx is formed in the second stage, made possible by the oxygen rich environment, coupled also with conditions conducive to chemical reaction, i.e., high temperature and an abundance of a catalytic material.

An object of the invention is, therefore, to provide assemblies and methods for consistently and reliably removing nitrogen oxides and carbon monoxide from the exhausts of spark-ignited gaseous-fueled internal combustion engines.

SUMMARY OF THE INVENTION

With the above and other objects in view, a feature of the invention is the provision of assemblies and methods for effectively reducing nitrogen oxides, carbon monoxide and hydrocarbons in spark-ignited, gaseous-fueled internal combustion engine exhausts, by presenting the gases entering a catalytic converter second stage at a lower temperature.

In accordance with the invention, the gases entering the second catalytic converter stage are cooled immediately following stage one, from the extremely high temperatures normally exiting the engine (800°-1250° F.) to a lower value. An intermediate temperature, or range of temperatures, provide desirable chemical reactions (CO and hydrocarbon removal) and are highly favored over those that are undesirable because of NOx formation. This is deemed to be a particularly viable approach in combining heat and power (CHP) applications, inasmuch as the gases are cooled in the heat reclaim process. Doing so in a CHP application requires only that (1) the cooling stage be reoriented to cool between stages, and (2) the cooling effectiveness be altered to reside in a favorable temperature range.

The above and other features of the invention, including various novel details of construction and combinations of parts and method steps, will now be more particularly described with reference to the accompanying drawings and pointed out in the claims. It will be understood that the particular assemblies and methods embodying the invention are shown by way of illustration only and not as limitations of the invention. The principles and features of this invention may be employed in various and numerous embodiments without departing from the scope of the invention.

BRIEF DESCRIPTION OF THE DRAWINGS

Reference is made to the accompanying drawings in which are shown illustrative embodiments of the invention, from which its novel features and advantages will be apparent.

In the drawings.

DESCRIPTION OF THE PREFERRED EMBODIMENTS

Figure 4:
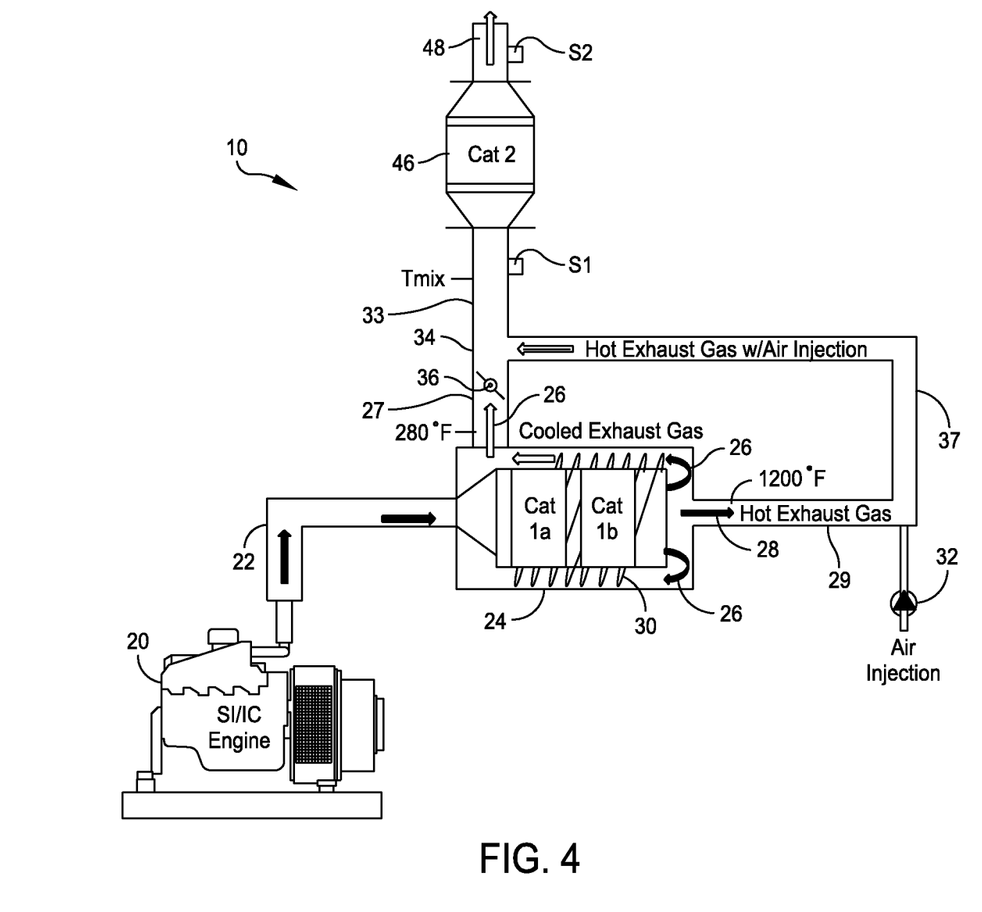
FIG. 4 is a diagrammatic depiction of an assembly and method for reducing nitrogen oxides, carbon monoxide and hydrocarbons in the exhaust of an engine, in accordance with an embodiment of the invention.

Testing of a two-stage system with inter-stage cooling was conducted using an apparatus depicted in FIG. 4. As shown in FIG. 4, the engine exhaust gases exit an engine 20 and are channeled by an exhaust gas conduit 22 to a catalytic converter first stage 24 having at least one, and preferably two, catalytic converters, Cat 1a and Cat 1b. Two catalytic elements are preferred, instead of one, to achieve high performance in the first stage 24 relative to NOx removal. A single catalytic converter element works well for the disclosed system with a slightly compromised performance of the first stage 24.

The combustion gases from the engine 20 enter the first stage 24 at a normal engine exhaust temperature (approximately 1200° F.), after which the exhaust flow is spilt into two streams 26, 28. One stream 26 is cooled to approximately 280° F. as it passes over cooling means 30, or through a conduit subject to an injected cooling medium adapted to vaporize and substantially reduce the stream temperature. The other stream 28 bypasses the cooling coils 30 and is injected with a controlled quantity of air from an air injector 32. The two streams 26, 28 rejoin, as at junction 34, then are piped into a second catalytic stage (Cat. 2) 46. The extent of the exhaust gas cooling can be adjusted with a temperature adjusting valve 36.

Three tests were conducted with this apparatus that demonstrate the disclosed invention, the tests being summarized below.

Test 1.

In a first experiment, the engine 20 was operated a high output (156 bhp and 2500 rpm) and fueled by natural gas. The temperature adjusting valve 36 was set such that most of the gases bypassed the cooling coils 30. Under steady state engine operation, and with the engine AFR fixed at a condition favoring NOx reduction out of the Stage 1 catalysts 24, the experiment summarized in FIG. 5 was initiated.

During the first 200 seconds and with no inter-stage air injection, the concentrations of NOx, CO, and 02 in the exhaust system, as well as the inter-stage exhaust temperature ("Tmix") were measured at port S1 (FIG. 4). In this time frame, and with sampling at S1, the emissions of NOx were well below the compliance limit, while CO values were non-compliant. Further, the inter-stage exhaust temperature was high, as expected (approximately 800° F.), while the $0_2$ concentration was very close to zero, indicative of near-stoichiometric operation. At 200 seconds and in preparation of air injection to begin, the sample port was moved to S2 (FIG. 4), immediately after the second stage (Cat 2). As expected, the CO and NOx concentrations measured after the second stage were modestly lower with the benefit of the additional catalyst element.

Figure 5:
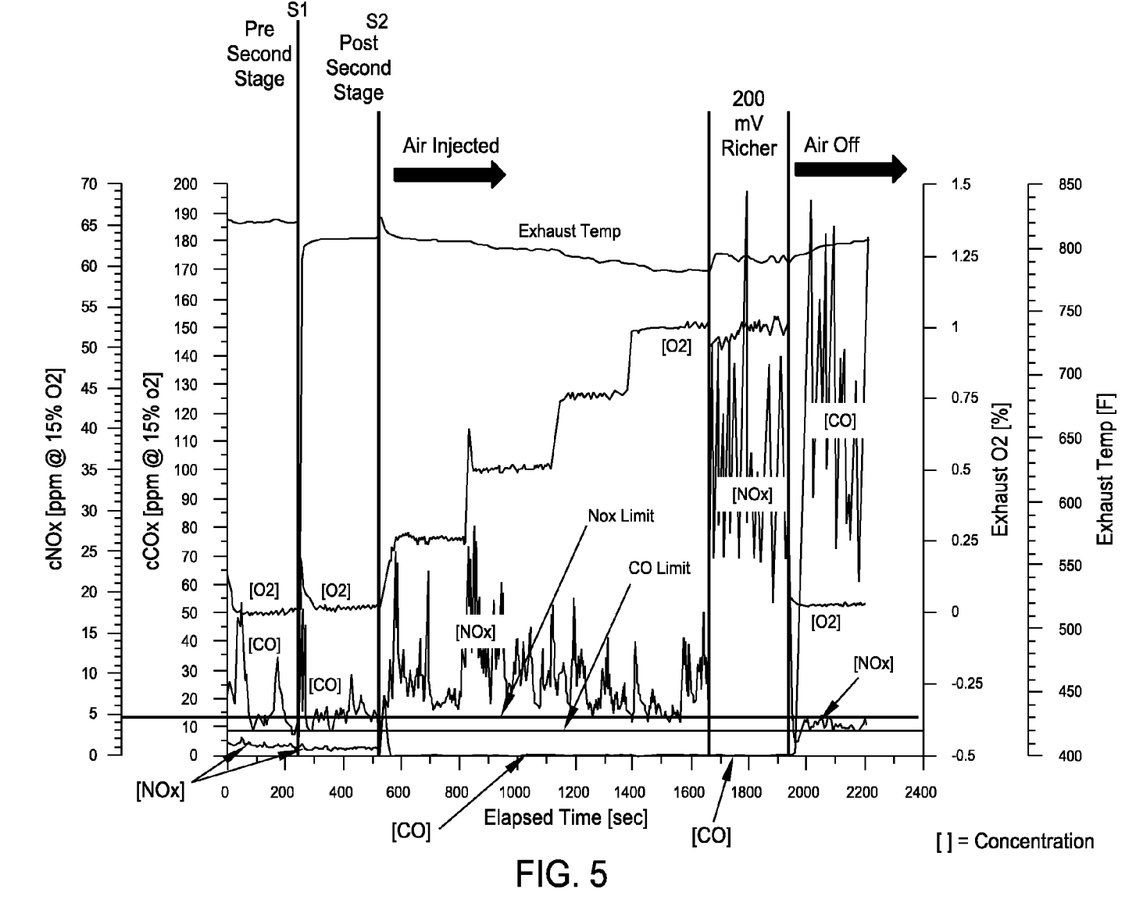
FIG. 5 is a chart illustrating the results of Test 1 described hereinbelow.

At 520 seconds inter-stage air injection was initiated, as is clearly indicated in FIG. 5 by the step change in $0_2$ concentration at port S2. CO immediately decreased to near zero, but NOx levels sharply increased, demonstrating the disappointing result obtained in the past without benefit of this invention.

As air injection was increased stepwise at 800, 1100, and 1400 seconds, the NOx improved slightly, but remained highly noncompliant. At 1660 seconds, a change in the engine combustion was made to a richer value, which only worsened the NOx emissions.

At 1950 seconds, the air injection was discontinued, essentially returning the process to a single stage. In this final time segment, operating as a single stage system with a rich AFR, the NOx concentration was measured to be low, while the CO was found to be high, the expected result (see FIG. 1).

Test 2.

Figure 6:
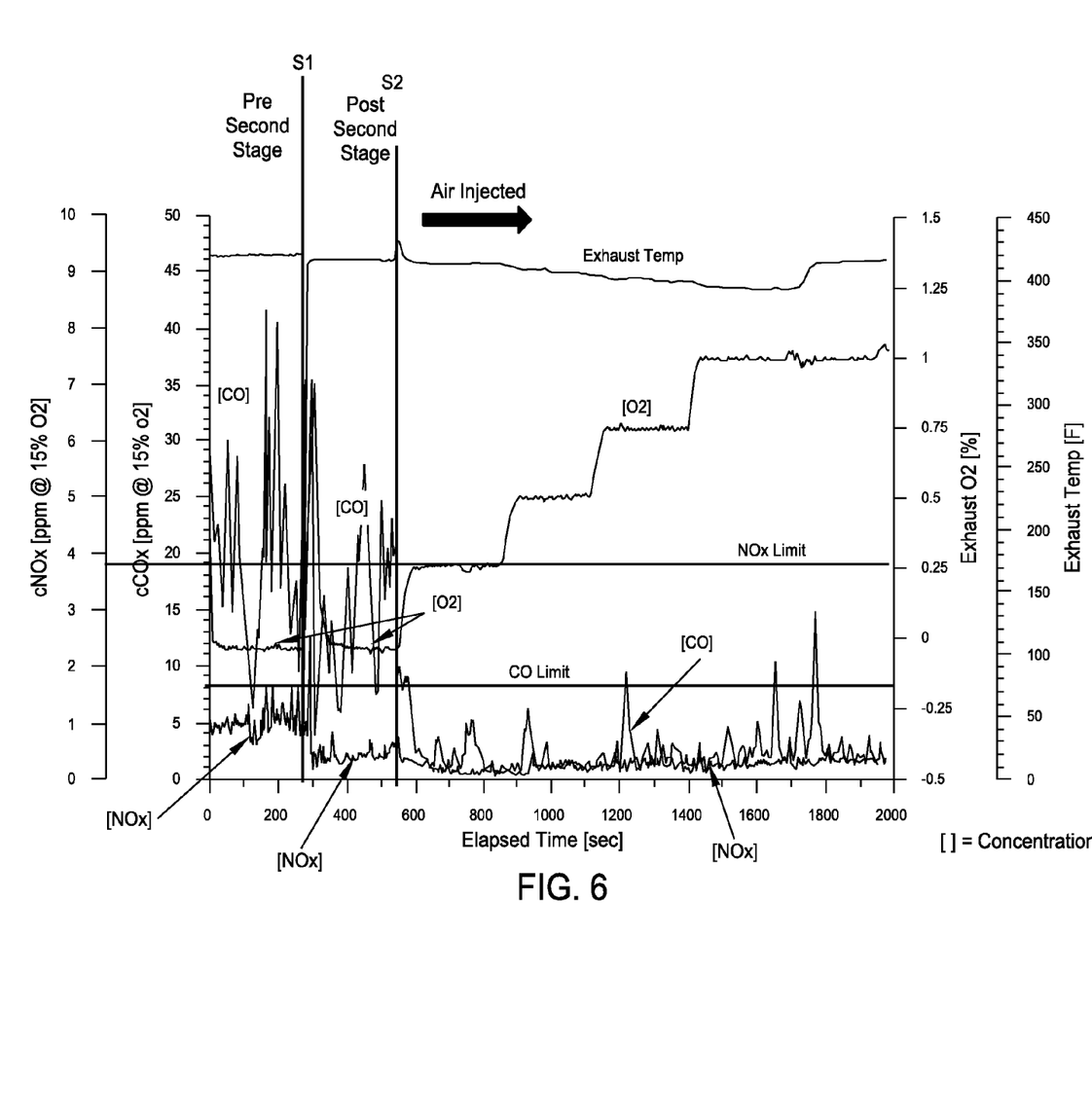
FIG. 6 is a chart similar to FIG. 5, but illustrating markedly different and greatly improved reductions of nitrogen oxides and carbon monoxide in use of the assembly of FIG. 4.

In a second experiment, Test 1 was repeated, but with inter-stage cooling increased to achieve lower "Tmix" values (400° F. range). The results, shown in FIG. 6, were markedly different. When air injection commenced at 550 seconds, the NOx concentration decreased from 0.5 PPM to approximately one half of the value, while the CO likewise reduced to concentrations well below compliance limits. Compliance testing is based on time average date taken over extended intervals with short-term spikes, such as those seen in Test 2 (FIG. 6), and which are permitted as long as they are not excessive.

The air injection, which had substantially negative effect on emissions at the higher temperature, was highly effective in improving the process when inter-stage cooling was substantially increased. It is important that the NOx reduction was not anticipated and is a very significant benefit of the process.

Test 3.

Figure 7:
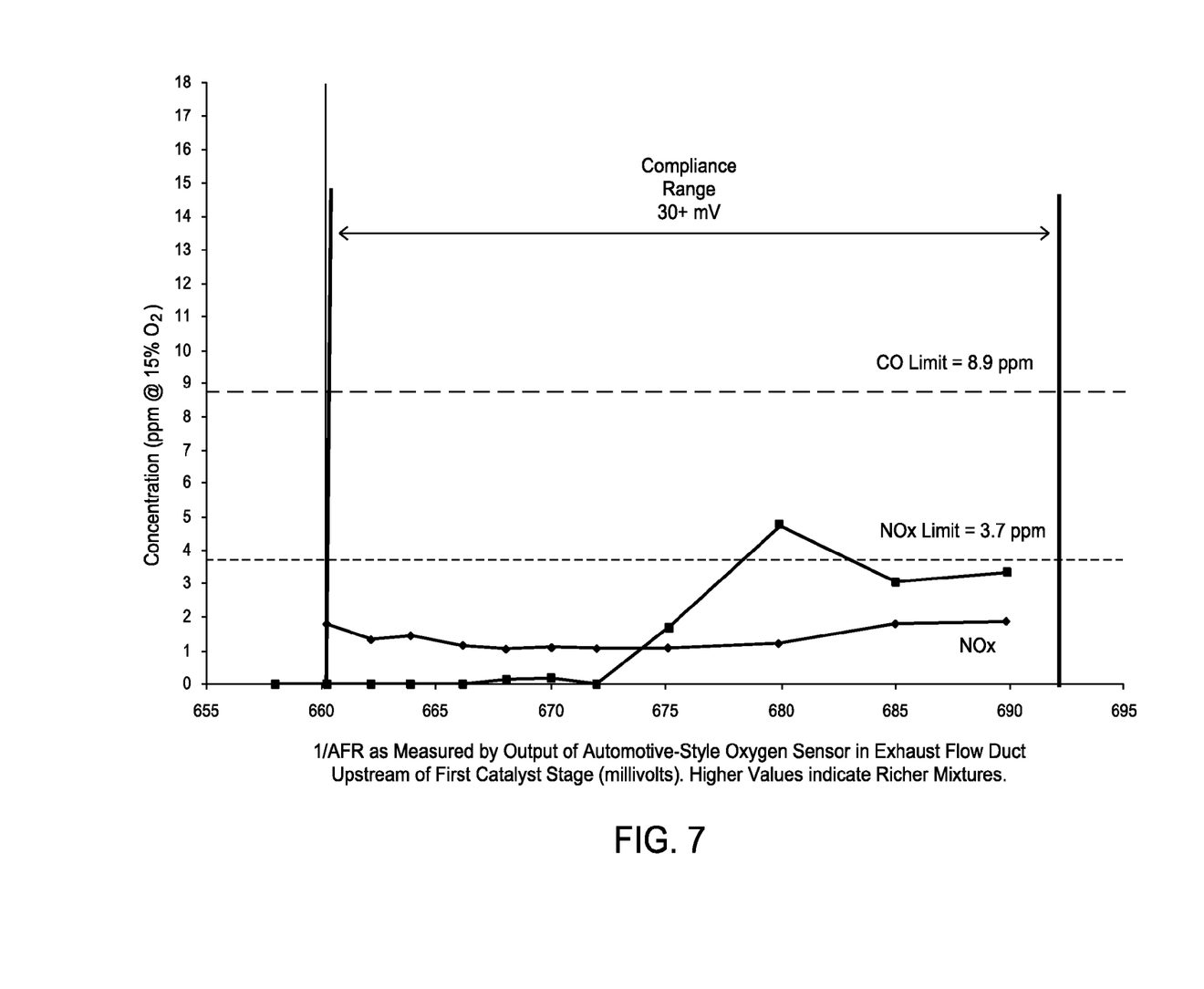
FIG. 7 is a chart showing that even with maladjustment of the air-to-fuel ratio controller, the inventive assemblies and methods provide for lower emissions and greater tolerance for excursions in engine air-to-fuel ratios.

In a third test, the system was first adjusted to a steady state condition that provided near optimum performance, namely inter-stage cooling to approximately 520° F. with air injection equal to approximately 1% of the primary combustion air. Next, an engine air to fuel ratio controller was adjusted stepwise to alternate steady state operating points, both richer and leaner, to determine the tolerance of the process to maladjustment. The results, shown in FIG. 7, indicate that the process was successfully compliant with lambda sensor readings from 660 mV to greater that 692 mV, essentially double the compliance window of the single stage catalyst system.

The new assembly and method provides, therefore, both lower emissions and greater tolerance for excursions in engines with air-fuel ratio under steady-state (non-dithering) fuel control. The same phenomenon and conclusions are applicable to dithering fuel control strategies, but with increases in the AFR compliance window, as measured by post-catalyst exhaust oxygen or lamda sensors.

There is thus provided by the present invention an assembly 10, shown in FIG. 4, for reducing nitrogen oxides, carbon monoxide and hydrocarbons in internal combustion engine exhausts. The assembly comprises a first exhaust conduit 22 having an exhaust receiving end for connecting to and extending from an internal combustion engine 20, a first stage catalytic converter means 24 in communication with a dispensing end of the first exhaust conduit 22, cooling means, such as cooling coils 30, disposed on the first stage catalytic converter means 24 for cooling a first portion of engine exhausts received from the first exhaust conduit 22.

The assembly further includes a first outlet conduit 27 for facilitating movement of the cooled first portion stream 26 of engine exhausts from the first stage catalytic converter means 24, a second outlet conduit 29 for facilitating movement of the second stream 28 of engine exhausts received from the first stage catalytic converter means 24, an air injection conduit 37 which receives air from the air injector 32 and is in communication with the second outlet conduit 29 for cooling the second portion of engine exhausts, a second exhaust gas conduit 33 in communication with the first outlet conduit 27 and the air injection conduit 37, and a second stage catalytic converter 46 in communication with the second exhaust gas conduit 33 and having an exhaust emitting outlet 48. The first outlet conduit 27 may optionally be provided with a temperature adjusting valve 36.

In operation of the assembly of FIG. 4, exhaust gases from the engine 20 pass through the first exhaust conduit 22 and into the first stage catalytic converter means 24 wherein a portion 26 of the exhaust is cooled and passed on to the first outlet conduit 27. A second portion 28 of the exhaust is not substantially cooled and is passed on to the second outlet conduit 29. The air injector 32 injects air into the second outlet conduit 29. The hot exhaust gas of the second exhaust stream 28 and injected air proceed through the air injection conduit 37 and merge with the cooled stream 26 of exhaust gas and proceed to the second catalytic converter stage 46 and exit therefrom at outlet 48.

Figure 8:
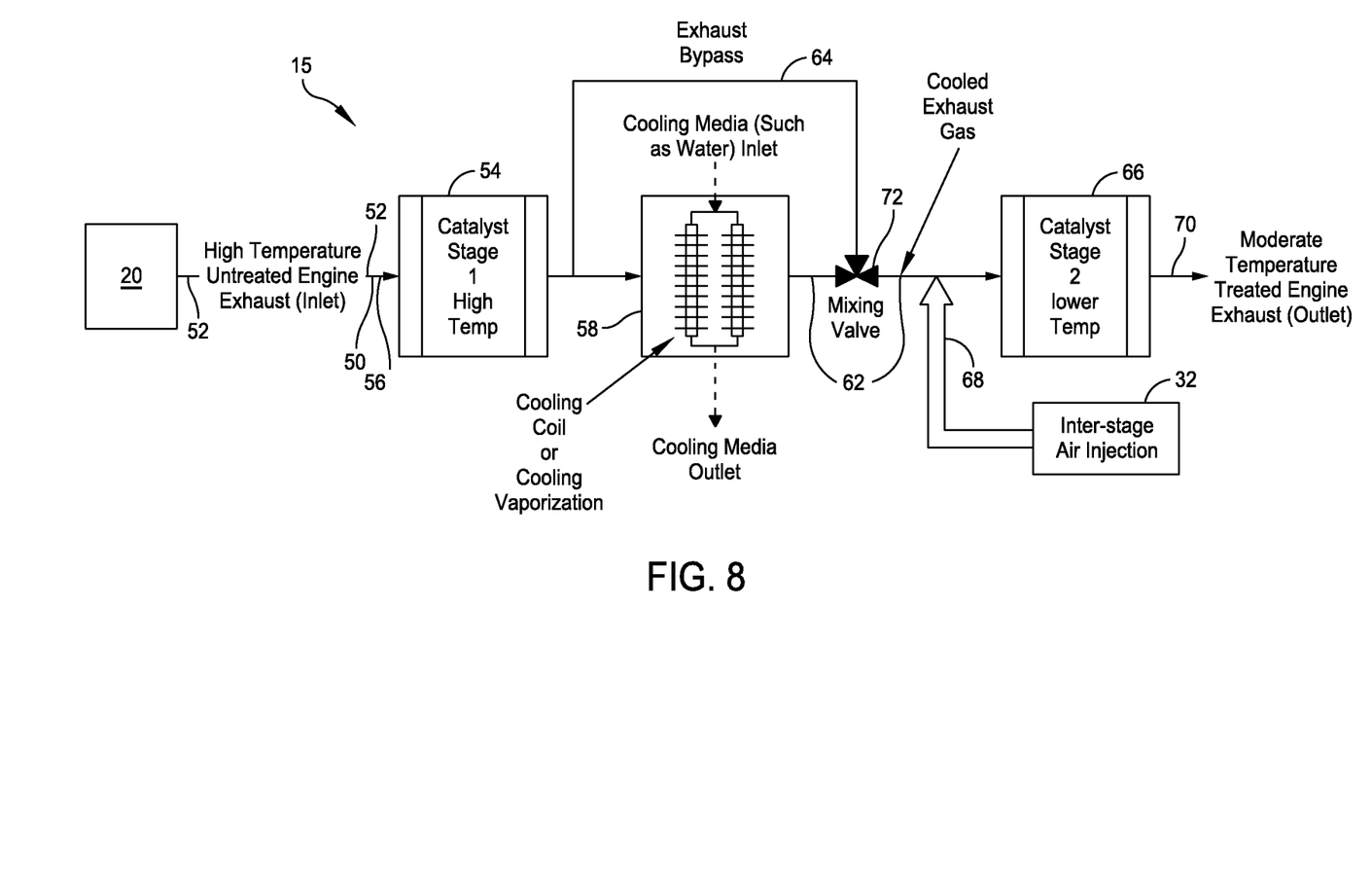
FIG. 8 is a diagrammatic depiction of a further assembly and method for reducing emissions of nitrogen oxides, carbon monoxide and hydrocarbons in internal combustion engines.

There is further provided an alternative embodiment 15 of the assembly for reducing nitrogen oxides, carbon monoxide and hydrocarbons in internal combustion engine exhausts, the alternative assembly 15 being shown in FIG. 8 and comprising a first exhaust conduit 50 having an exhaust receiving end 52 connected to and extending from the internal combustion engine 20, a first stage catalytic converter means 54 in communication with a dispensing end 56 of the first exhaust conduit 50, cooling means 58 in communication with the first stage catalytic converter means 54 for cooling a first portion 60 of engine exhausts received from the first stage catalytic converter means 54, and a conduit 62 for cooled exhaust, the conduit 62 extending from the cooling means 58.

The assembly 15 further includes a cooling means by-pass 64 in communication with the output of the first stage catalytic converter means 54 and the conduit 62 for cooled exhaust.

A second stage catalytic converter means 66 is in communication with the cooled exhaust conduit 62 and the cooling means by-pass conduit 64. An air injection conduit 68 is in communication with the cooled exhaust conduit 62. An exhaust outlet 70 extends from the second stage catalytic converter means 66.

In operation of the assembly of FIG. 8, exhaust gases from the engine 20 flow to the first stage catalytic converter 54. A first portion of the exhaust leaving the first catalytic converter stage 54 is directed to the cooling means 58. A second portion of the exhaust leaving the first catalytic converter stage 54 enters a cooling means bypass conduit 64 which joins the cooled exhausts conduit 62 exiting the cooling means 58. The combined exhaust from the cooling means 58 and the by-pass conduit 64 combine, as at mixing valve 72, and are subjected to an injection of air from the air injector 32, and directed to the second stage catalytic converter means 66, from which the exhaust issues through the outlet 70 with greatly reduced nitrogen oxides and carbon monoxide.

There is further provided in conjunction with the assembly 10, shown in FIG. 4, a method for reducing nitrogen oxides, carbon monoxide and hydrocarbons from exhausts of internal combustion engines. The method comprises the steps of conveying the engine exhaust to a first stage catalytic converter 24, cooling a first portion of the engine exhaust in the first stage catalytic converter 24 and removing the cooled first portion from the catalytic converter through a first exhaust gas outlet conduit 27, removing a non-cooled portion of the engine exhaust from the catalytic converter 24 through a second exhaust gas outlet conduit 29, injecting air into the second outlet conduit 29, conveying the non-cooled second portion of the engine exhaust and the injected air through air injection conduit 37 to the first exhaust gas outlet conduit 27 to join with the cooled first portion of the engine exhaust in the air injection conduit 37.

The method further comprises directing the exhaust in the exhaust gas conduit 33 to a second stage catalytic converter 46, and discharging exhaust from the second stage catalytic converter 46, whereby to provide engine exhausts of less nitrogen oxides and less carbon monoxide content.

There is further provided in conjunction with the assembly 15, shown in FIG. 8, a method for reducing nitrogen oxides, carbon monoxide and hydrocarbons from exhausts of internal combustion engines.

The method comprises the steps of conveying the engine exhausts to a first stage catalytic converter 54 and conveying the engine exhaust from the first stage catalytic converter 54 in part to a cooling means 58 and in part to a cooling means by-pass 64, and mixing exhausts from the cooling means 58 and the cooling means by-pass 64 in a cooled exhaust conduit 62, injecting air through an air injection conduit 68 into the cooled exhaust conduit 62, and directing the exhaust from the cooling means 58, and from the cooling means by-pass 64, and from the injected air conduit 68, to a second stage catalytic converter 66, and discharging through an outlet 70 the engine exhausts thus treated, whereby to provide engine exhausts of less nitrogen oxides and less carbon monoxide content.

In accordance with a still further feature of the invention there is provided a method for reducing nitrogen oxides, carbon monoxide and hydrocarbons in exhausts of spark-ignited gaseous fueled internal combustion engines. The method comprises the steps of directing the exhausts from an engine 20 to a first stage catalytic converter 24, 54, directing a first portion of exhaust output from the first stage catalytic converter 24, 54 to a cooling means 30, 58 and thence to a cooled exhaust conduit 26, 62, directing a second portion of exhaust output from the first stage catalytic converter 24, 54 to a non-cooled exhaust gas conduit 28, 64, uniting the first and second portions of exhaust gas and directing the united first and second portions to a second catalytic converter 46, 66 and injecting air into a selected one of (1) the non-cooled exhaust conduit 29 and (2) the united cooled and non-cooled exhausts after the uniting thereof.

Figure 4A:
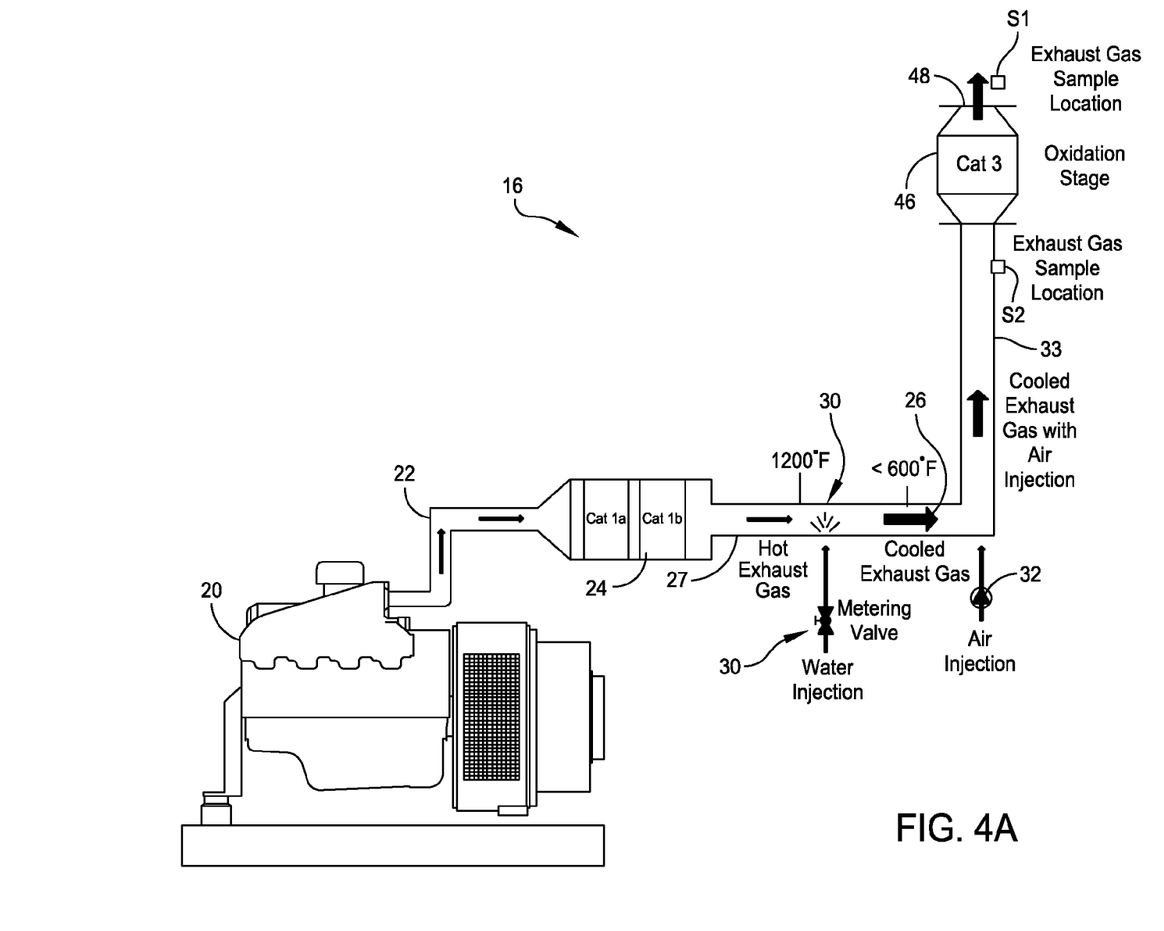
FIG. 4A is a diagrammatic depiction of an alternative assembly.

In an alternative embodiment 16 of the system of FIG. 4, for use in situations in which the load is steady and the liquid used for cooling is maintained at a steady rate, the embodiment of FIG. 4A can be provided and operated without the hot exhaust gas outlet conduit 29 and an injection conduit 37 shown in FIG. 4.

Figure 8A:
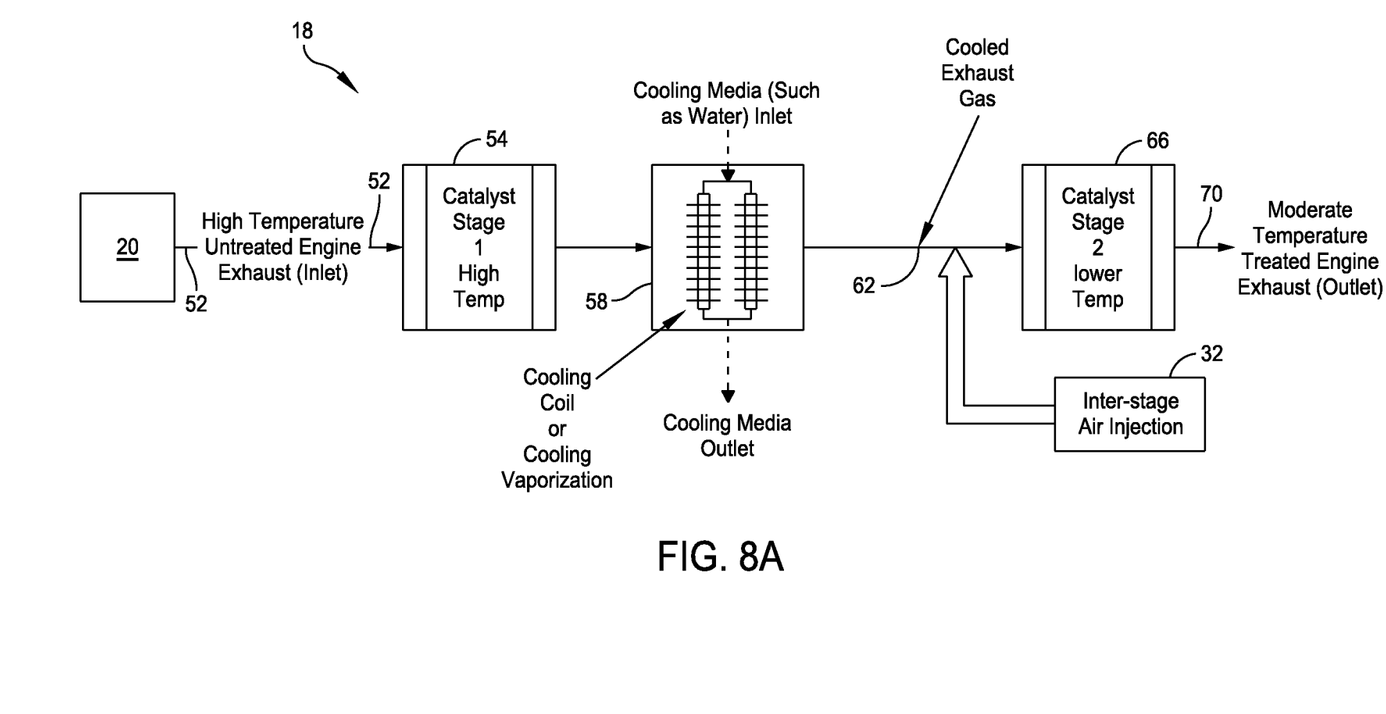
FIG. 8A is a diagrammatic depiction of a still further alternative assembly.

Similarly, an alternative embodiment 18 (FIG. 8A) can effect the desired lowering of emmissions in a system maintained at a steady load and a steady rate, in which the exhaust by-pass 64 and mixing valve 72 are omitted from the assembly, as is illustrated in FIG. 8A.

Thus, the alternative embodiment of the FIG. 4 assembly, shown in FIG. 4A, comprises the exhaust conduit 22, the cooling means 30 of vaporization construction, the outlet conduit 27, the exhaust gas conduit 33, the air injector 32 disposed to inject air into the exhaust gas conduit 33, and the second stage catalytic connecter means 46 and its outlet 48.

The method for reducing nitrogen oxides, carbon monoxide and hydrocarbons in exhaust from internal combustion engines utilizing the assembly shown in FIG. 4A comprises the steps of directing exhaust from the internal combustion engine to a first stage catalytic converter means, water-cooling the exhausts from the catalytic converter means and directing the cooled exhausts toward a second stage catalytic converter means, injecting air into the cooled exhausts, directing the air-cooled exhausts into the second catalytic converter means, and discharging the exhausts therefrom.

The alternative embodiment of FIG. 8A comprises an assembly the same as is shown in FIG. 8, but without the exhaust by-pass 64 and the mixing valve 72. That is, the assembly comprises an exhaust conduit 52, a first stage catalytic connecter means 54 in communicatoin with a cooling means, the cooling means 58 having coils or a cooling vaporization facility. The assembly further includes air injections means 32 for injecting air into an output line 62 from the cooling means 58, and a second stage catalytic converter means 66 with an outlet 70 for treated exhausts.

The method for reducing nitrogen oxides, carbon monoxide and hydrocarbons in exhausts from internal combustion engines utilizing the assembly shown in FIG. 8A comprises the steps of directing exhausts from the internal combustion engine to the first catalytic converter means, cooling exhausts from the first catalytic converter, injecting air into the cooled exhausts, directing the cooled exhausts into a second stage catalytic connecter means, and discharging the exhausts from the second catalytic converter means.

It is to be understood that the present invention is by no means limited to the particular construction and method steps herein disclosed and/or shown in the drawings, but also comprises any modification or equivalent within the scope of the claims.

What is claimed is:

1. A method of operating a catalytic system for reducing emissions from a rich burn spark-ignited engine, comprising:
controlling intake air and fuel (AFR) to produce first exhaust gases substantially free of oxygen;
passing said first exhaust gases into a first-stage catalyst chamber containing a three-way catalyst (TWC), which minimizes NOx content by reducing NOx (to $N_2$ and $O_2$) to form second exhaust gases;
cooling said second exhaust gases to 390-520° F.;
increasing an oxygen content of said second exhaust gases to about 0.25-1.0%;
passing said cooled exhaust gases into a second-stage catalyst chamber containing a catalyst that minimizes CO content by oxidizing CO to $CO_2$.

2. The method of claim 1, wherein the engine is a stationary engine in a combined heat and power (CHP) application.

3. The method of claim 2, further comprising cooling said second exhaust gases to 390-420° F.

4. The method of claim 2, wherein emissions of NOx exiting the first stage catalyst chamber are less than 3.7 ppm (at 15% $O_2$), and emissions of CO exiting the second stage catalyst chamber are less than 8.9 ppm (at 15% $O_2$), said emissions based on time-average data taken over an extended interval.

5. The method of claim 1, wherein the AFR is provided using a gaseous fuel/air mixer, a computer controlled fuel valve, and gaseous fuel is provided to the fuel/air mixer at atmospheric pressure.

6. The method of claim 5, wherein said gaseous fuel is Natural Gas.

7. The method of claim 1, wherein cooling said second exhaust comprises water-cooling said second exhaust.

8. The method of claim 1, wherein cooling said second exhaust comprises passing said second exhaust across cooling coils.

9. The method of claim 1, wherein cooling said second exhaust comprises passing said second exhaust into a cooling vaporization facility.

10. The method of claim 1, further comprising introducing an air source into said second exhaust to increase said oxygen content.

11. The method of claim 10, further comprising injecting air into said second exhaust.

12. The method of claim 11, wherein said air injecting occurs after said cooling.

13. The method of claim 11, said cooling comprising:
dividing said second exhaust into a first stream and a bypass stream;
cooling said first stream to a first temperature;
combining said first and bypass streams to form a combined exhaust stream, said combined exhaust stream having a temperature Tmix between 390-520° F.

14. The method of claim 13 wherein said first temperature is approximately 280° F.

15. The method of claim 13, further comprising adjusting a flow rate of at least one of said first stream and said bypass stream to control said temperature Tmix.

16. The method of claim 15, wherein said flow rate is adjusted with a mixing valve in fluid communication with said first stream and said bypass stream.

17. The method of claim 13, wherein said cooling said first stream comprising passing said first stream across cooling coils.

18. The method of claim 13, wherein said cooling said first stream comprising passing said first stream into a cooling vaporization facility.

19. The method of claim 13, further comprising introducing an air source into said first stream to increase said oxygen content.

20. The method of claim 19, further comprising injecting air into said first stream.

* * * * *